(12) United States Patent
Milz et al.

(10) Patent No.: US 12,451,019 B2
(45) Date of Patent: Oct. 21, 2025

(54) METHOD FOR SAFELY DETERMINING A FLIGHT PATH OF AN UNMANNED AERIAL VEHICLE, AND UNMANNED AERIAL VEHICLE

(71) Applicant: Spleenlab GmbH, Saalburg-Ebersdorf (DE)

(72) Inventors: Stefan Milz, Saalburg-Ebersdorf (DE); Florian Ölsner, Jena (DE); Sukumar Karthigeyan, Bad Lobenstein (DE); Ashwanth Ammapalayam Ravichandran, Bad Lobenstein (DE); Chris Hagen, Bad Lobenstein (DE)

(73) Assignee: Spleenlab GmbH (DE)

( * ) Notice: Subject to any disclaimer, the term of this patent is extended or adjusted under 35 U.S.C. 154(b) by 160 days.

(21) Appl. No.: 18/120,545

(22) Filed: Mar. 13, 2023

(65) Prior Publication Data

US 2023/0298474 A1 Sep. 21, 2023

(30) Foreign Application Priority Data

Mar. 16, 2022 (DE) .................... 10 2022 106 110.8

(51) Int. Cl.
*G08G 5/55* (2025.01)
*G06T 7/70* (2017.01)
*G08G 5/30* (2025.01)
*G08G 5/57* (2025.01)

(52) U.S. Cl.
CPC ................ *G08G 5/55* (2025.01); *G06T 7/70* (2017.01); *G08G 5/30* (2025.01); *G08G 5/57* (2025.01); *G06T 2207/10032* (2013.01)

(58) Field of Classification Search
CPC .................................................. G01S 19/485
See application file for complete search history.

(56) References Cited

U.S. PATENT DOCUMENTS

| | | | |
|---|---|---|---|
| 2008/0019564 A1* | 1/2008 | Murata | G06V 20/39 |
| | | | 342/357.31 |
| 2016/0299231 A1 | 10/2016 | Bianchi et al. | |
| 2017/0090036 A1* | 3/2017 | Zalewski | G01S 19/215 |
| 2018/0157220 A1 | 6/2018 | Guoxiu et al. | |
| 2019/0113629 A1* | 4/2019 | Kang | G01S 19/06 |
| 2019/0340197 A1 | 11/2019 | Sugaya | |
| 2021/0082140 A1* | 3/2021 | Tazoe | G06T 3/4007 |

(Continued)

FOREIGN PATENT DOCUMENTS

WO 2020006709 1/2020

*Primary Examiner* — Ryan Rink
(74) *Attorney, Agent, or Firm* — Boyle Fredrickson, S.C.

(57) ABSTRACT

A method for safely determining a flight path of an unmanned aerial vehicle, in which an unmanned aerial vehicle is moved along a three-dimensional flight path and in which context the following is repeatedly provided: determination of first position data for a spatial position of the unmanned aerial vehicle along the three-dimensional flight path; determination of second position data for the spatial position of the unmanned aerial vehicle, independently of the determination of the first position data; execution of a plausibility check for the first position data; determination of the first position data as a spatial position of the unmanned aerial vehicle; control of the movement of the unmanned aerial vehicle along the three-dimensional flight path in accordance with the spatial position.

9 Claims, 5 Drawing Sheets

(56) References Cited

U.S. PATENT DOCUMENTS

| | | |
|---|---|---|
| 2021/0247764 A1 | 8/2021 | Liu et al. |
| 2022/0019970 A1* | 1/2022 | Williams ............. G05D 1/0094 |
| 2022/0390621 A1* | 12/2022 | Song ....................... G01S 19/47 |
| 2023/0025084 A1* | 1/2023 | Rohde ................... G01S 19/243 |

* cited by examiner

METHOD FOR SAFELY DETERMINING A FLIGHT PATH OF AN UNMANNED AERIAL VEHICLE, AND UNMANNED AERIAL VEHICLE

BACKGROUND OF THE INVENTION

Field of the Invention

The preferred embodiments relate to a method for safely determining a flight path of an unmanned aerial vehicle, and to an unmanned aerial vehicle.

Description of the Related Art

There are methods of known art for the determination of a flight path or a flight trajectory of an unmanned aerial vehicle, in which the desired flight path is continuously determined using a positioning system to control the unmanned aerial vehicle appropriately for the movement along a three-dimensional flight path. It is of known art, for example, to use a satellite navigation system, for example the GPS system, for the determination of spatial position, and thus for the control of the unmanned aerial vehicle. Position determination using the satellite navigation system can be impaired, or not possible at all, in individual flight phases, for example if the signals from the satellites cannot be received by the appropriate sensors on the unmanned aerial vehicle, or are impaired.

SUMMARY OF THE INVENTION

It is an object of the invention to specify a method for safely determining a flight path of an unmanned aerial vehicle, together with an unmanned aerial vehicle that enables the unmanned aerial vehicle to be reliably controlled for the movement along a three-dimensional flight path, even when a position determination system of the unmanned aerial vehicle is impaired, or is not available.

To solve the problem, a method for safely determining a flight path of an unmanned aerial vehicle, together with an unmanned aerial vehicle, are provided in accordance with the independent claims 1 and 9. Embodiments are the subject matter of dependent claims.

In accordance with one aspect, a method is provided for safely determining a flight path of an unmanned aerial vehicle, wherein an unmanned aerial vehicle is moved along a three-dimensional flight path, and in which context the following steps are repeated: determination of first position data for a spatial position of the unmanned aerial vehicle along the three-dimensional flight path by means of a first position determination system, assigned to the unmanned aerial vehicle as a master system; determination of second position data for the spatial position of the unmanned aerial vehicle, independently of the determination of the first position data, by means of a second position determination system assigned to the unmanned aerial vehicle, which is distinct from the first position determination system; execution of a plausibility check for the first position data, wherein a check is made for the first position data and the second position data as to whether these satisfy at least a first check specification; determination of the first position data as a spatial position of the unmanned aerial vehicle, if the plausibility check shows that the first position data and the second position data satisfy the at least first check specification; and control of the movement of the unmanned aerial vehicle along the three-dimensional flight path in accordance with the spatial position. The first and the second position determination systems are selected from the following group of position determination systems: (i) satellite navigation system; (ii) image-based position determination system, which is configured to determine the first or the second position data from image recordings of an environment of the unmanned aerial vehicle, using artificial intelligence-based image analysis; and (iii) lidar position determination system, which is configured to determine the first or the second position data from three-dimensional optical measurements of the environment of the unmanned aerial vehicle, using artificial intelligence-based measurement data analysis.

In accordance with a further aspect, an unmanned aerial vehicle is provided, which comprises the following: a first position determination system, which is assigned to the unmanned aerial vehicle as a master system; and a second position determination system, which is assigned to the unmanned aerial vehicle, and is distinct from the first position determination system. The first and the second positioning systems are selected from the following group of positioning systems: (i) satellite navigation system; (ii) image-based position determination system, which is configured to determine the first or the second position data from image recordings of an environment of the unmanned aerial vehicle, using artificial intelligence-based image analysis; and (iii) lidar position determination system, which is configured to determine the first or the second position data from three-dimensional optical measurements of the environment of the unmanned aerial vehicle, using artificial intelligence-based measurement data analysis. The unmanned aerial vehicle is configured to execute the method for safely determining the flight path, using the first and the second position determination systems.

With the aid of the first and the second position determination systems, the (current) spatial position of the unmanned aerial vehicle is continuously determined in a redundant manner (over the desired time period, for example the time of a flight from take-off to landing) in order to control the movement of the unmanned aerial vehicle on this basis. The first and the second position data are determined independently of each other with the aid of different position determination systems. The spatial position of the unmanned aerial vehicle is determined free of any fusion of the position data determined by means of the position determination systems, wherein the first position data determined with the master system (the first position determination system) are determined as the position data indicating the spatial position of the unmanned aerial vehicle and are used for the movement control, if it is determined in the plausibility check that the first position data and the second position data satisfy the at least first check specification. For example, the first check specification can require that the first and the second position data agree within predetermined error limits. Since the determination of the first and the second position data is executed independently using separate and distinct position determination systems, this increases the confidence in the determination of the spatial position of the unmanned aerial vehicle, and the control of the unmanned aerial vehicle along the flight path that is based on this data.

In at least one of the two position determination systems that are used to determine the first and the second position data, the determination of the position data is carried out using artificial intelligence, either for image analysis, and/or for the evaluation of the three-dimensional optical measurements (the lidar position determination system).

When executing the plausibility check on the first position data and the second position data, a check can be executed to determine whether the first position data and the second position data satisfy a second check specification; and the second position data can be determined to be the spatial position of the unmanned aerial vehicle if the plausibility check determines that the first position data and the second position data do not satisfy at least the first check specification, but do satisfy the second check specification. Provision can be made to check the second check specification only if the plausibility check determines that the first and the second position data do not satisfy the first check specification, for example, if the separation distance between the positions for the unmanned aerial vehicle indicated by the first and the second position data lies outside predetermined error limits. In this case, a second check specification can then be called upon, which, for example, specifies a larger error tolerance (a larger position separation distance). If the first and the second position data satisfy the second check specification, the spatial position of the unmanned aerial vehicle is determined in accordance with the second position data. Control of the unmanned aerial vehicle is then executed taking account of the second position data for the (current) spatial position of the unmanned aerial vehicle. For example, an upcoming section of the flight movement can then be controlled and executed based on the second position data.

An emergency measure can be initiated for the unmanned aerial vehicle if the plausibility check shows that the first position data and the second position data satisfy neither the at least first check specification, nor the second check specification. If, for example, a comparison of the first and the second position data shows that they satisfy neither the first, nor the second, check specification, this exemplary embodiment provides for the initiation of an emergency measure for the unmanned aerial vehicle, for example an emergency landing. The first and the second check specifications can, for example, specify different error tolerance ranges for a deviation between the first and the second position data. If the first and the second position data do not satisfy either of the check specifications, the emergency measure is initiated. This can also take the form of moving the unmanned aerial vehicle back to an original starting point of the three-dimensional flight path.

Alternatively, the emergency measure can be initiated if the first and the second position data do not individually satisfy the first check specification.

For the unmanned aerial vehicle, in one example the emergency measure can be initiated only if it is additionally determined that the first position data and/or the second position data satisfy an error check specification. Also, in this example, even if the first and the second position data do not satisfy either the first or the second error check specification, the emergency measure is only initiated if it is determined that the first and/or the second position data satisfy an error check specification, for example, if the first and/or the second position data fall outside an error limit specified for the position data. If the first and the second position data do not in fact satisfy either the first or the second check specification, but do not satisfy the error check specification, provision can be made to call upon the first or the second position data for the (current) spatial position of the unmanned aerial vehicle, for example on the basis of a weighting requirement with respect to the first and the second position data.

The satellite navigation system, assigned to the unmanned aerial vehicle as the master system, can be used as the first position determination system, and the image-based position determination system, or the lidar position determination system, can be used as the second position determination system assigned to the unmanned aerial vehicle. In this example, the satellite navigation system is provided as the master position determination system, whose determined first position data are determined as the spatial position of the unmanned aerial vehicle if the at least first check specification is met. If the first check specification is met, the unmanned aerial vehicle is continuously controlled along the three-dimensional flight path using the position data determined by the satellite navigation system, which takes the form, for example, a GPS system. If the satellite navigation system is (temporarily) unable to determine a position, the second position data determined by the image-based positioning system, or the lidar positioning system, can be used.

In various embodiments, it is additionally possible to determine third position data with a third position determination system, which is distinct from the first and the second position determination systems. The third position data can then be called upon as supplementary data in the plausibility check. The first position data can, for example, be compared in each case with the second and third position data in accordance with a respective check specification. The spatial position of the unmanned aerial vehicle can then be determined using the first position data, if the first and the second check specifications are fulfilled. Otherwise, the error check specification can, for example, be executed on this data.

In the image-based positioning system, for determining the first or the second position data from the image recordings, when using artificial intelligence-based image analysis, a current pose of the unmanned aerial vehicle can be determined based on a previously determined optical flow for the image recordings using a neural network. Pose or spatial position is usually the combination of position and orientation of the object (unmanned aerial vehicle) in the coordinates system used. The optical flow of a sequence of image recordings is usually a vector field of velocities of visible points or image pixels of the object space in the coordinate system projected into the image plane. Optical flow is a representation of motion information in image analysis or processing.

In the lidar position determination system, for determining the first or the second position data from the three-dimensional optical measurements, when using the artificial intelligence-based measurement data analysis, a current pose of the unmanned aerial vehicle can be determined, based on an optical flow for the three-dimensional optical measurements previously determined by means of a neural network. When evaluating the three-dimensional optical measurements of the lidar position determination system, evaluation steps in the position data determination are applied in accordance with the method in the context of the image-based position determination system.

For the spatial position, an optimisation process can be carried out in which, with the inclusion of disparity data, a local and a global bundle adjustment, also bundle block adjustment, are carried out. As such, methods for local and global bundle adjustment in the context of three-dimensional position determination are of known art in various forms of embodiment. Bundle adjustments serve to optimise a position trajectory over a plurality of time steps (a course of successively determined positions for the unmanned aerial vehicle). On the one hand, this can be used (local bundle block adjustment) to counteract so-called drift effects, a successive deviation of the estimated trajectory from the true position path. On the other hand (globally) it is used to detect a loop of the position course and thus to obtain an even better position accuracy. In principle, the light beams of different measurements, for example temporally separated image recordings, are optimised with respect to each other.

The embodiments discussed above in the context of the method for safely determining the flight path of the unmanned aerial vehicle can be accordingly provided individually, or in any combination, in connection with the unmanned aerial vehicle.

BRIEF DESCRIPTION OF THE DRAWINGS

In what follows, further examples of embodiment_are explained with reference to a set of figures. Here.

DETAILED DESCRIPTION OF THE PREFERRED EMBODIMENTS

Figure 1:
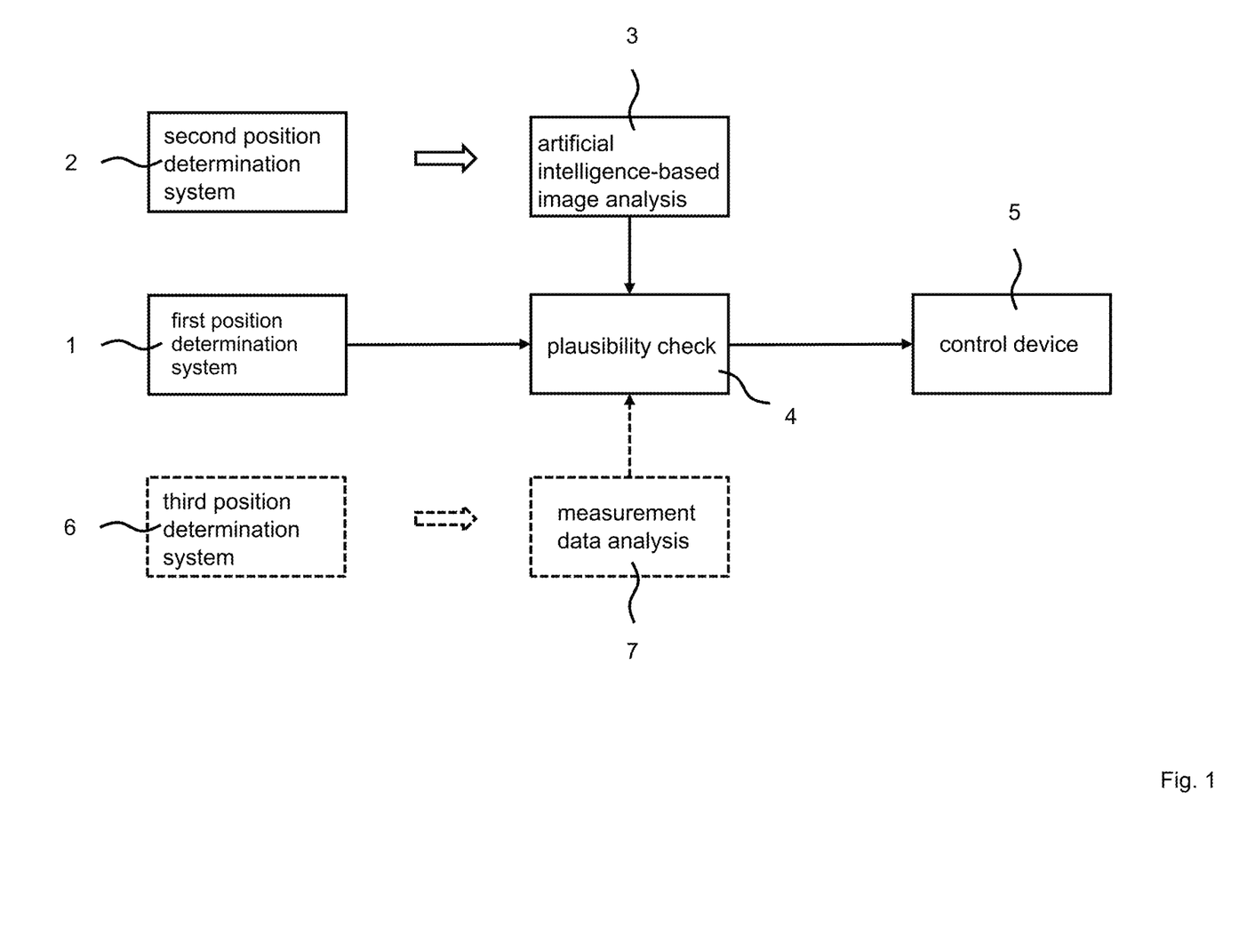
FIG. 1 shows a schematic representation of functional components of an unmanned aerial vehicle, which are configured to execute a redundant position determination for the unmanned aerial vehicle.

FIG. 1 shows a schematic representation of functional components for the control of an unmanned aerial vehicle when it is moving along a three-dimensional flight path, in particular functional components for the repeated provision of (current) spatial position data for the unmanned aerial vehicle.

A first position determination system 1 is provided, which takes the form of a satellite navigation system, for example a GPS system. The first position determination system 1 is configured for the continuous determination of first position data for the determination of a (current) spatial position of the unmanned aerial vehicle. As such, satellite position determination systems are of known art in various forms of embodiment and deliver position data in an associated coordinate system.

The unmanned aerial vehicle also has a second position determination system 2, which is an image-based position determination system that is configured to determine the second position data for the unmanned aerial vehicle from image recordings for the environment of the unmanned aerial vehicle. An artificial intelligence-based image analysis 3 is provided for this purpose.

For a plausibility check 4, the first position determination system 1 supplies first position data, and the second position determination system 2 supplies the second position data. In the plausibility check 4, the first and the second position data are compared or checked in accordance with at least a first check specification. The first check specification, for example, specifies a predetermined separation distance between the first position data and the second position data.

The plausibility check can be carried out in different ways depending on the criticality of the application, in particular in accordance with the principles of safe systems. Here, a distinction can be made between the multi-channel principle, monitoring, and/or the safety gate. In the multi-channel principle, the first position data from the first position determination system 1, and the second position data from the second position determination system 2, are checked against each other and, if necessary, processed by means of optimisation, for example with the calculation of the mean value from the first and the second position data to form two output signals, or a safe signal (position data). In the course of monitoring, one path, that is to say, the first position determination system 1 or the second position determination system 2, forms a checker and another path forms a doer. In the event of inconsistency, the doer is switched off, and enforces a different state of the overall system. In the case of the safety gate, only validated signals are forwarded by the checker.

If the first and the second position data satisfy the at least first check specification, the first position data determine the (current) spatial position of the unmanned aerial vehicle, that is to say, the position data that were determined with the satellite navigation system (the first position determination system 1), which is assigned to the unmanned aerial vehicle as the master system. The control of the unmanned aerial vehicle with the aid of a control device 5 is then carried out based on or starting from the spatial position, that is to say, based in particular on the first position data.

In particular in case the first and the second position data do not satisfy the at least first check specification during the plausibility check 4, provision can be made to include at least a second check specification of both plausibility checks 4, wherein the second check specification specifies, for example, a larger (tolerable) separation distance between the first and the second position data compared to the first check specification. If the first and the second position data satisfy the second check specification (but not the first check specification), then in one example provision is made to set the spatial position of the unmanned aerial vehicle equal to the second position data, and then to control the unmanned aerial vehicle on the basis thereof, or on the basis thereof in the movement along the three-dimensional flight path.

The redundant and independent determination of the first and the second position data by means of the first and the second position determination system 1, 2, in particular free of any fusion of measurement data and/or determined position data, enables a safeguarding of the position data determined by means of the master system, in that these are checked or compared within the framework of the plausibility check 4 on the basis of the second position data.

If the first and the second position data satisfy neither the first nor the second check specifications, provision can be made to initiate an emergency measure for the unmanned aerial vehicle, for example, to control the unmanned aerial vehicle in accordance with an emergency landing. Alternatively, such an emergency measure can also be provided if the first and the second position data do not individually satisfy the first check specification.

In one example, provision can be made to execute an error check specification for the first and the second position data if they satisfy neither the first nor the second check specifications. The error check specification can, for example, specify an error limit for a separation distance between the first and the second position data. An emergency measure can, for example, only then be provided if it has also been determined that the first and the second position data satisfy the error check specification, that is to say, indicate an (incorrect) minimum separation distance from each other.

In FIG. 1, the exemplary embodiment optionally provides a third position determination system 6, which takes the form of a lidar position determination system, which is configured to determine position data from three-dimensional optical measurements of the environment of the unmanned aerial vehicle (using artificial intelligence-based measurement data analysis), and is also independent of the position data determination in the first and the second position determination systems 1, 2. The second and the third position determination systems 2, 6 can in each case be used in combination with the first position determination system 1 in the control of the unmanned aerial vehicle. In addition to the first and the second position data, provision can also be made to determine third position data with the third position determination system 6 by means of a measurement data analysis 7, redundantly and independently of the other position determinations. By this means, a further safety level can be implemented, in particular in order to check the position data provided by the master system additionally and independently of the comparison between the first and the second position data.

In overall terms, the first position data provided by the master system, that is to say, in the exemplary embodiment shown, the data provided by the first position determination system 1, is only used for the (current) spatial position, and thus for the control of the unmanned aerial vehicle, if the plausibility check 4 has been successful, that is to say, if a check specification regarding the second and/or the third position data has been fulfilled with respect to the first position data. In contrast to a fusion of sensor signals or sensor data, the position data are in each case determined independently of each other and in a redundant manner by means of the position determination systems in order then to check the position data of the master system for plausibility. As an alternative to defining the satellite navigation system to be the master system, the second or the third position determination system 2, 6 can be assigned to the unmanned aerial vehicle as the master system.

Figure 2:
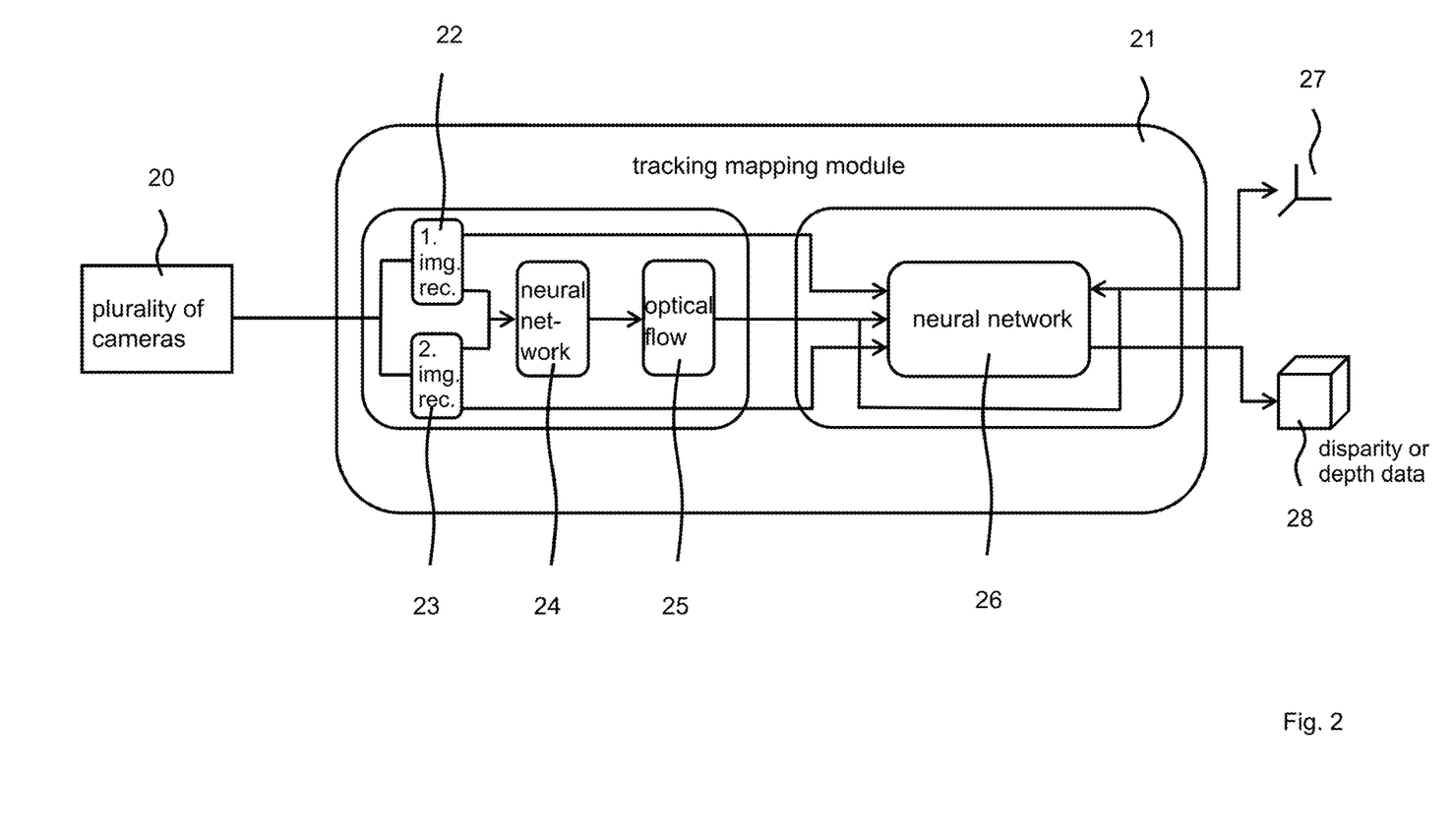
FIG. 2 shows a schematic representation for an image-based positioning system for the unmanned aerial vehicle.
Figure 3:
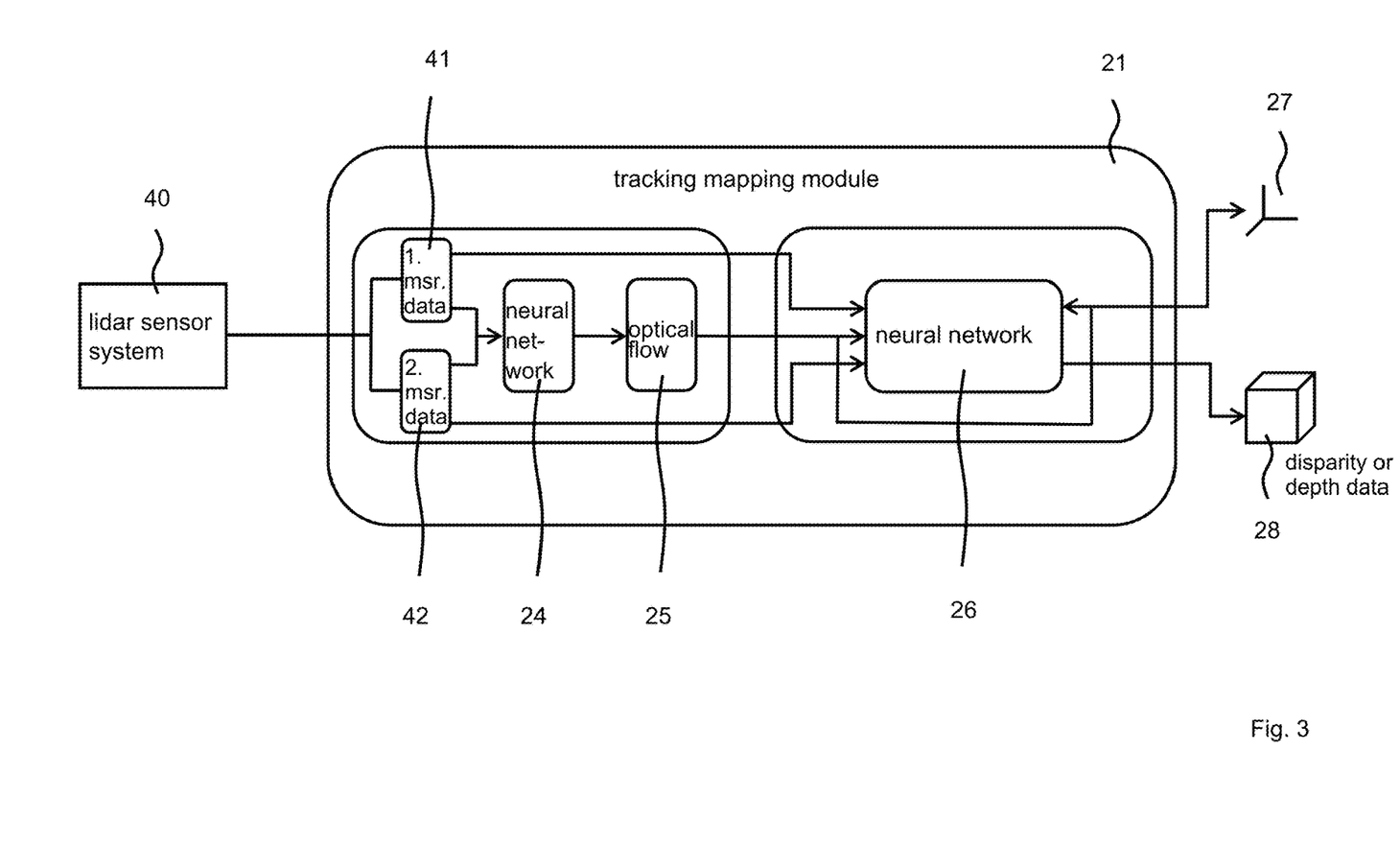
FIG. 3 shows a schematic representation for a lidar position determination system for the unmanned aerial vehicle.

FIGS. 2 and 3 show schematic representations relating to the determination of the first and the second position data using artificial intelligence respectively, based on the image recordings of the environment (image-based position determination system) or the three-dimensional optical measurements (lidar position determination system).

In accordance with FIG. 2, one or a plurality of cameras 20 are used to capture image recordings of the unmanned aerial vehicle's environment. In a tracking mapping module 21, which is implemented in terms of hardware and software, two successive image recordings 22, 23 are made available to a neural network 24 as input. The neural network 24 thus receives, for example, two three-dimensional digital image matrices (RGB) with the resolution of the camera(s) 20. The neural network 24 determines an optical flow 25, that is to say, a pixel-based registration of the two image recordings 22, 23, which is reflected as a vector field (pixel displacement per pixel) with a grid size of the image matrix. The optical flow 25 serves as input for another neural network 26, which executes a pose estimation. The further neural network 26 also takes as input the two image recordings 22, 23 and the results of the previous pose estimation from the other neural network 26 from the previous time step (iterative). In the example shown, the other neural network 26 receives the following input variables: two three-dimensional image matrices (image recordings 22, 23, RGB images); the pose from the previous time step; a one-dimensional image matrix (depth from the previous time step); a two-dimensional image matrix (optical flow 25), which estimates the depth per pixel; and the position as a six-dimensional vector. In the example shown, the output position data 27 and disparity or depth data 28 are (optionally) fed to a local and a global bundle adjustment 29, 30 (cf. FIG. 4 below).

FIG. 3 shows a schematic representation for a position determination using artificial intelligence comparable to the procedure described in connection with FIG. 2, wherein three-dimensional optical measurement data is here acquired with the aid of a lidar sensor system 40, which is subsequently evaluated for position determination for the unmanned aerial vehicle. The same reference symbols as in FIG. 2 are used for similar features in FIG. 3. Thus, successive measurement data 41, 42 are transmitted to the neural network 24 for the determination of the optical flow 25. In comparison to the camera-based method (cf. FIG. 2), the successive measurement data 41, 42 here contain a grid of lidar measurement points, which, in comparison to camera image data, assume two values per pixel (depth and intensity), wherein the pixel coordinate represents the grid point in a lidar measurement world.

Figure 4:
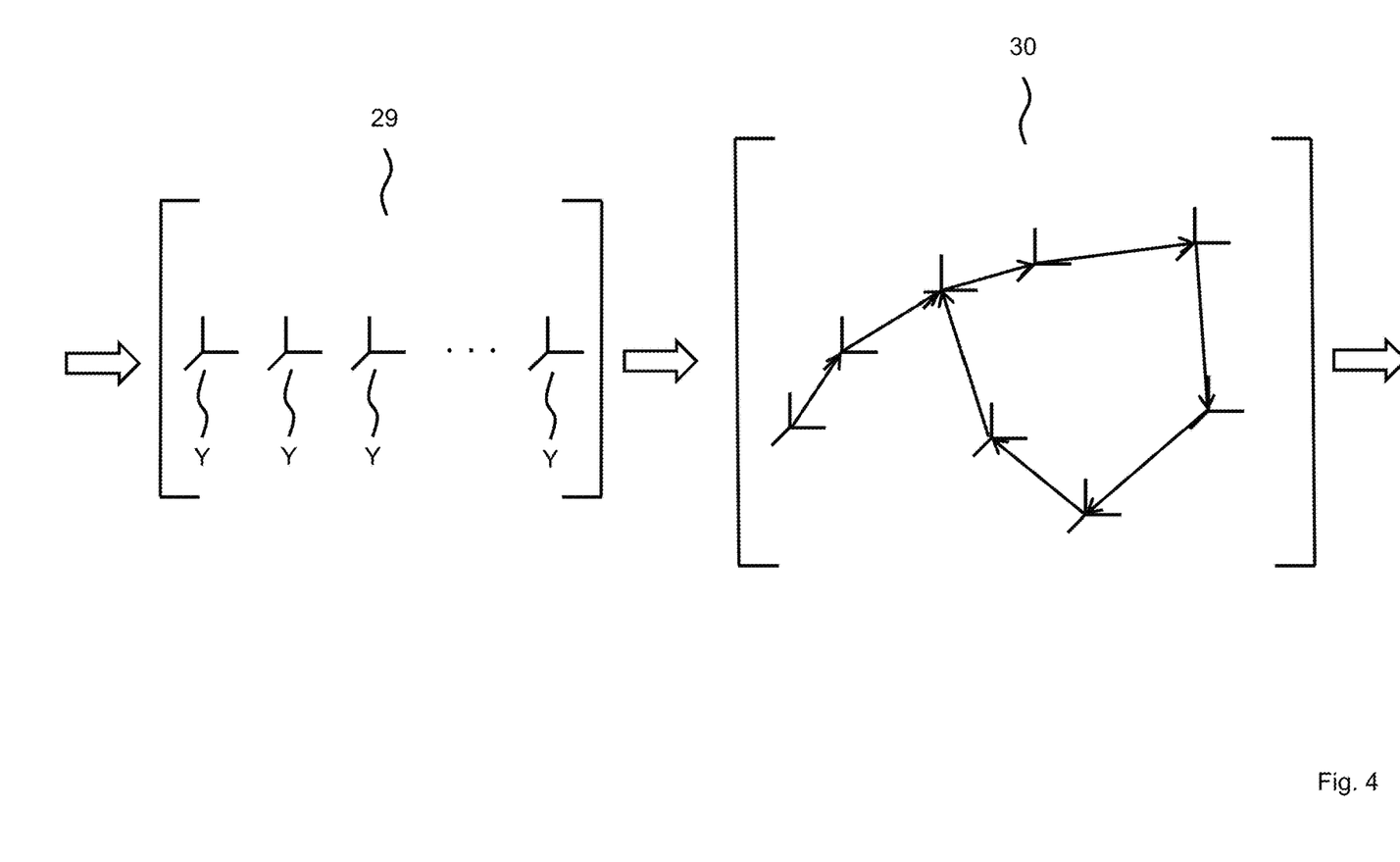
FIG. 4 shows a schematic representation relating to a combination of local and global bundle adjustment for previously determined spatial position data.

FIG. 4 shows a schematic representation relating to the local and the global bundle adjustment 29, 30, using the position data 27 as well as the disparity data 28 (cf. FIGS. 2 and 3). The different position data are optimised by means of the bundle adjustment 29, 30. Here, the individual visual bundles of the measurements are optimised to the position values over a plurality of measurements. Methods and processes for local and/or global bundle adjustment are of known art as such in various forms of embodiment (cf. for example Agarwal et al., Bundle adjustment in the large. In Computer Vision-ECCV 2010, 11th European Conference on Computer Vision, p. 29-42, 2010).

Figure 5:
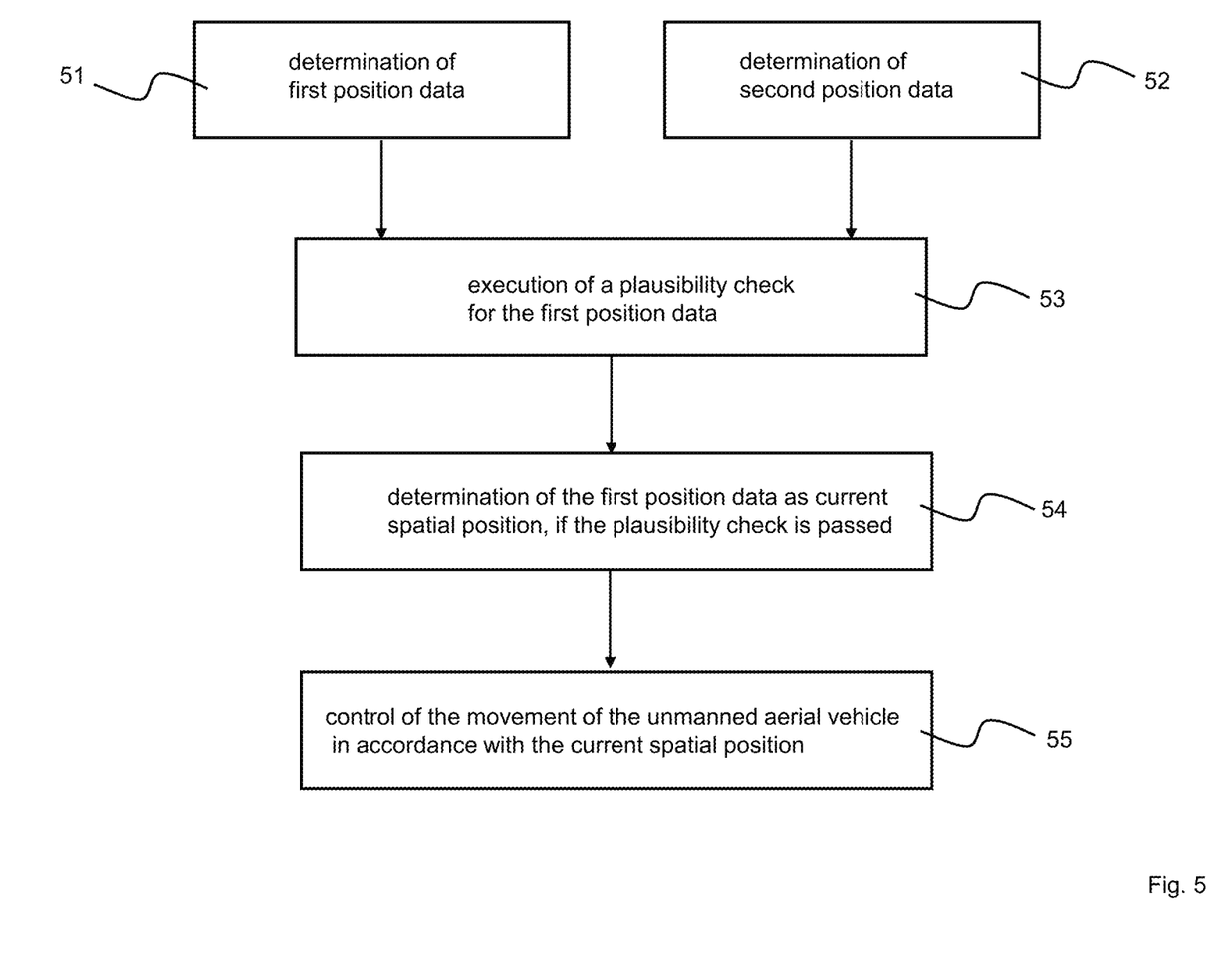
FIG. 5 is a flow chart illustrating a method of the preferred embodiment.

A high-level illustration of a method of the preferred embodiments is provided in FIG. 5. In Blocks 51 and 52, the method determines first position data and second position data, respectively. Next, in Block 53, the method executes a plausibility check for the first position data. Then the method determines whether the first position data is the current spatial position, depending on if the plausibility check is passed (Block 53), in Block 54. In Block 55, the method controls the movement of the unmanned aerial vehicle in accordance with the current spatial position.

The features disclosed in the above description, the claims, as well as the figures, can be of significance for the implementation of the various embodiments, both individually, and also in any combination.

What is claimed is:

1. A method for safely determining a flight path of an unmanned aerial vehicle, in which an unmanned aerial vehicle is moved along a three-dimensional flight path, the method comprising:
   determination of first position data for a spatial position of the unmanned aerial vehicle along the three-dimensional flight path by a first position determination system, assigned to the unmanned aerial vehicle as a master system;
   determination of second position data for the spatial position of the unmanned aerial vehicle, independently of the determination of the first position data, by a second position determination system, assigned to the unmanned aerial vehicle, which is distinct from the first position determination system;
   execution of a plausibility check for the first position data, wherein a check is made for the first position data and the second position data as to whether these satisfy at least a first check specification;
   determination of the first position data as the current spatial position of the unmanned aerial vehicle, if the plausibility check shows that the first position data and the second position data satisfy the at least first check specification; and control of the movement of the unmanned aerial vehicle along the three-dimensional flight path in accordance with the current spatial position;

wherein the first and the second position determination systems are selected from the following group of position determination systems: (i) satellite navigation system; (ii) image-based position determination system, which is configured to determine the first or the second position data from image recordings of an environment of the unmanned aerial vehicle, using artificial intelligence-based image analysis; and (iii) lidar position determination system, which is configured to determine the first or the second position data from three-dimensional optical measurements of the environment of the unmanned aerial vehicle, using artificial intelligence-based measurement data analysis.

2. The method according to claim 1, wherein:

when the plausibility check is executed for the first position data and the second position data, a check is made as to whether these satisfy a second check specification; and the second position data are determined as the spatial position of the unmanned aerial vehicle, if the plausibility check shows that the first position data and the second position data do not satisfy the at least first check specification, but do satisfy the second check specification.

3. The method according to claim 2, wherein an emergency measure is initiated for the unmanned aerial vehicle if the plausibility check shows that the first position data and the second position data satisfy neither the at least first check specification nor the second check specification.

4. The method according to claim 3, wherein the emergency measure is initiated for the unmanned aerial vehicle only if is additionally determined that the first position data and/or the second position data satisfy an error check specification.

5. The method according to claim 1, wherein the satellite navigation system is used as the first position determination system assigned to the unmanned aerial vehicle as the master system, and the image-based position determination system, or the lidar position determination system, is used as the second position determination system assigned to the unmanned aerial vehicle.

6. The method according to claim 1, wherein in the image-based position determination system for the determination of the first or the second position data from the image recordings, when using artificial intelligence-based image analysis, a current pose of the unmanned aerial vehicle is determined, based on an optical flow for the image recordings previously determined by means of a neural network.

7. The method according to claim 1, wherein in the lidar position determination system for the determination of the first or the second position data from the three-dimensional optical measurements, when using artificial intelligence-based measurement data analysis (7), a current pose of the unmanned aerial vehicle is determined, based on an optical flow for the three-dimensional optical measurements previously determined by means of a neural network.

8. The method according to claim 6, wherein an optimisation process is executed for the spatial position, in which, with the inclusion of disparity data, a local and a global bundle adjustment are executed.

9. An unmanned aerial vehicle, comprising:

a first position determination system, which is assigned to the unmanned aerial vehicle as a master system; and a second position determination system, which is assigned to the unmanned aerial vehicle, and is distinct from the first positioning system;

wherein the first and second positioning systems are selected from the following group of positioning systems: (i) satellite navigation system; (ii) image-based position determination system, which is configured to determine the first or the second position data from image recordings of an environment of the unmanned aerial vehicle using artificial intelligence-based image analysis; and (iii) lidar position determination system, which is configured to determine the first or the second position data from three-dimensional optical measurements of the environment of the unmanned aerial vehicle using artificial intelligence-based measurement data analysis; and wherein the unmanned aerial vehicle is configured to execute a method according to claim 1, using the first and second position determination systems.

\* \* \* \* \*